Patented June 10, 1924.

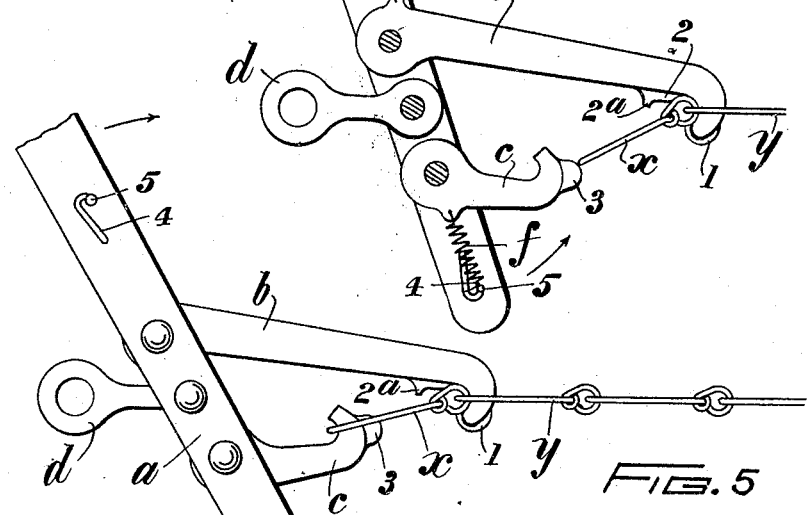

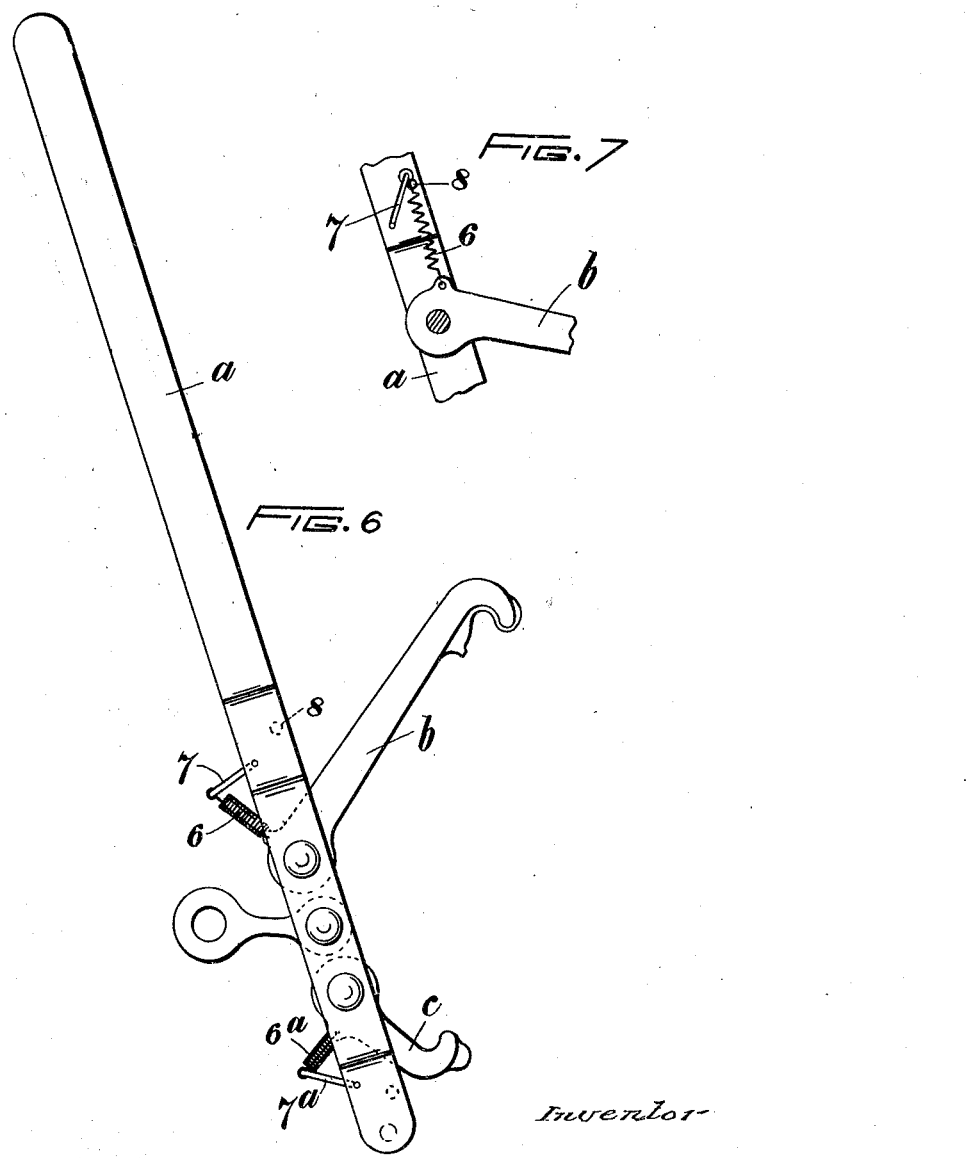

1,497,566

UNITED STATES PATENT OFFICE.

EDWARD ALLAN IRONSIDE, OF LONDON, ENGLAND.

WIRE STRAINER.

Application filed February 8, 1923. Serial No. 617,826.

*To all whom it may concern:*

Be it known that I, EDWARD ALLAN IRONSIDE, a British subject, and resident of 39 Grosvenor Place, London S. W. 1, England, have invented certain new and useful Improvements in Wire Strainers, of which the following is a specification, such as will enable others skilled in the art to which it appertains to make and use the same.

This invention relates to wire strainers such as are used in erecting wire fences and of that type which comprises a lever having means for attachment to an anchor wire or equivalent, two spring-controlled hooks (one long and one short) and a chain furnished with a gripping device for the wire to be strained.

This type of tool is very satisfactory in use and the object of my invention is to make it still more so and especially with reference to the engagement of the spring-controlled hooks in the chain which latter is, according to my invention, acted upon by the hooks in such a manner that the tool becomes almost automatic in effecting the grip or engagement of the hooks in the links of the chain.

In carrying out the invention the longer of the hooks is furnished with a rib or the like extending from the inside over the nose of the hook which rib, when the outside of the hook is pressed against the chain, will serve to guide the hook into the link; and when the hook has entered the chain, the rib on the inner side of the hook will engage the links in succession, and hold them in substantially correct alignment position for the smaller hook to engage them.

In addition to this the smaller hook has an external projection which will, when it moves towards the link it is to engage, depress the hook under the tension of the hook spring so that it will pass under the link and enter it in an easy and quick manner. The said projection will also compensate for inequalities in lengths of links. I may also provide another projection on the longer hook to facilitate lifting it from the links, and in addition the springs of either or both hooks may be releasable as to tension when the tool is out of use permitting folding of the parts with the hooks alongside the lever.

The invention is illustrated in the accompanying drawings, in which:

Fig. 1 is a view in elevation partly broken off, showing the parts in initial position.

Fig. 2 is a similar view showing the parts in the positions occupied following initial straining movement.

Fig. 3 is a similar view showing the parts in the positions following a succeeding straining movement.

Fig. 4 is a broken elevation showing the means for guiding the main or longer hook into the chain link.

Fig. 5 is a plan illustrating particularly the connection between the links of the chain.

Fig. 6 is a view in elevation of the improved implement showing a modified means for releasing the spring tension at will.

Fig. 7 is a broken elevation partly in section, showing the spring tensioning means of Fig. 6 in position to maintain tension on the spring.

In the drawings, lever $a$ of usual type is provided with long hook $b$ and short hook $c$ and also with anchor means $d$. The hooks have springs $e$ and $f$ respectively. The chain is shown at $x$, $y$. All these parts are substantially known and I have not shown the gripping means on the chain as these may be as usual or of any convenient form. The initial movement of lever $a$ is indicated by the arrows in Fig. 1.

Fig. 2 shows the result of the movement indicated in Fig. 1 and which brings both hooks into engagement with the chain and the arrows at Fig. 2 indicate the next movement of the lever to push the hook $b$ over and into another link as seen in Fig. 3, which has also arrows to show its next movement to bring the lever to the position seen in Fig. 1.

The hook $b$ is provided with a rib 1 and a projection 2 whilst hook $c$ has an external projection 3. The rib 1 is designed to fit between the double ends of the chain links as is seen in Figs. 3 and 4, and it will be evident that when the chain is taut the rib on the hook when pressed against the chain by the operation of the lever will enter between the double ends of the chain links, and will serve to guide the hook into the links. Having entered the link, the rib 1 on the inner surface of the hook will enter between the double ends of the preceding chain link, which will be held substantially in alignment with the engaged link and thus directed towards the approaching hook c. When the hook c is advanced towards the link it is to next engage, the projection 3 on the hook will strike the end of the link and lift it and at the same time press back the hook c, which passes under the end of the link so as to become engaged therewith. A stop or cross piece 2ª prevents the said link being raised too high, when it might lie against the hook b and thus not leave room for the hook c to enter the link.

When the shorter hook c engages a link the longer hook b disengages when advanced to take another link, the disengagement being obviously assisted by projection 2.

The springs e and f are attached in any manner to their respective hooks, but instead of connecting them each at one definite position on the lever, I construct the lever with slots 4 having pocket ends and provide the springs with pins 5, which when permitted to move lengthwise the slots will release the tension on the springs. When the tool is in use, the pins are placed in the pockets and the springs will be under tension.

Other methods of effecting this purpose may be employed, such for example as that shown in Figs. 6 and 7, in which the hook b (equivalent of that shown in Fig. 1) is connected to one end of a spring 6, the other end of which is connected to a crank 7, capable of rotation and adapted to be turned from the inoperative position, Fig. 6, to the position seen in Fig. 7, in which the crank is arrested by a pin 8 to thus tension the spring. A like spring (6ª) crank (7) and pin (8ª) are used with the hook c.

What I claim is:—

1. A device for straining wire, comprising a lever, and chain cooperating hooks carried thereby, one of said hooks being provided with means to guide the hook into a particular chain link and to engage and support the preceding link in a position to be engaged by the other hook.

2. A device for straining wire, comprising a lever, and chain cooperating hooks carried thereby, one of said hooks being provided with means to guide the hook into a particular chain link and to engage and support the preceding link in a position to be engaged by the other hook, such other hook having means to engage and position said preceding link for cooperation with such other hook.

3. An implement, comprising a lever having a long spring controlled hook and a short spring controlled hook, a rib on the long hook to cooperate with a chain link to guide said hook into said link, and a projection on said long hook to guide said hook from the engaged link in the release movement of the hook.

4. An implement, comprising a lever, a long hook and a short hook, a rib on said long hook to engage a chain link and guide the hook into a succeeding link, said rib serving to engage and hold the preceding link elevated, and means on the short hook to engage and guide said preceding link to a position to be engaged by the short hook.

5. An implement, comprising a lever, a long hook and a short hook, a rib on said long hook to engage a chain link and guide the hook into a succeeding link, said rib serving to engage and hold the preceding link elevated, and means on the short hook to engage and guide said preceding link to a position to be engaged by the short hook, said long hook being provided with a projection to cooperate with the engaged link to lift the hook therefrom in the release movement of the hook.

In witness whereof I have hereunto set my hand in presence of a witness.

EDWARD ALLAN IRONSIDE.

Witness:
HENRY FAIRBROTHER.